(12) United States Patent
Fukuda et al.

(10) Patent No.: US 7,605,345 B2
(45) Date of Patent: Oct. 20, 2009

(54) METHOD AND DEVICE FOR PREVENTION OF ADHESION OF DIRT AND CONTAMINATION ON OPTICAL PARTS IN LASER BEAM MACHINE

(75) Inventors: Naoaki Fukuda, Osaka (JP); Akikazu Kitagawa, Osaka (JP); Takashi Kawahara, Osaka (JP)

(73) Assignee: Hitachi Zosen Corporation, Osaka (JP)

( * ) Notice: Subject to any disclaimer, the term of this patent is extended or adjusted under 35 U.S.C. 154(b) by 571 days.

(21) Appl. No.: 10/507,718

(22) PCT Filed: Mar. 14, 2003

(86) PCT No.: PCT/JP03/03124

§ 371 (c)(1),
(2), (4) Date: May 13, 2005

(87) PCT Pub. No.: WO03/076117

PCT Pub. Date: Sep. 18, 2003

(65) Prior Publication Data

US 2005/0206894 A1    Sep. 22, 2005

(30) Foreign Application Priority Data

Mar. 14, 2002 (JP) .............................. 2002-070274

(51) Int. Cl.
*B23K 26/16* (2006.01)
(52) U.S. Cl. ................................................. 219/121.84
(58) Field of Classification Search ...............................
219/121.63–121.72, 121.84; 359/507, 509
See application file for complete search history.

(56) References Cited

U.S. PATENT DOCUMENTS

| 3,899,749 | A | * | 8/1975 | Hill et al. ....................... 372/90 |
| 4,128,753 | A | * | 12/1978 | Sharp ..................... 219/121.63 |
| 5,354,964 | A | * | 10/1994 | Kyoren et al. ........... 219/121.84 |
| 5,424,508 | A | * | 6/1995 | Swain et al. ............ 219/121.84 |
| 5,690,895 | A | * | 11/1997 | Matsumoto et al. ............ 422/73 |
| 5,756,962 | A | * | 5/1998 | James et al. ............ 219/121.75 |
| 5,938,954 | A | * | 8/1999 | Onuma et al. ........... 219/121.84 |
| 6,111,214 | A | * | 8/2000 | Saito ..................... 219/121.63 |
| 6,425,346 | B1 | * | 7/2002 | Birk .......................... 119/14.18 |
| 6,528,761 | B1 | * | 3/2003 | Roos et al. ............. 219/121.83 |
| 6,580,053 | B1 | * | 6/2003 | Voutsas .................. 219/121.66 |

(Continued)

FOREIGN PATENT DOCUMENTS

EP          1016493 A2 * 12/1999

(Continued)

*Primary Examiner*—Samuel M Heinrich
(74) *Attorney, Agent, or Firm*—Brinks Hofer Gilson & Lione

(57) ABSTRACT

In a laser machining system, gas is injected while air is inducted from the rear of a plurality of injection nozzles (9c) disposed in the space between the machining head (3) and the workpiece (M) and disposed at stipulated intervals in the direction in which the laser light passes, so as not to disturb the machining gas, thus preventing the adhesion of dust arising during laser machining to optical components (31, 32) within the head (3). A light receptor (4) that receives light reflected or dispersed due to adhered contamination is disposed upstream of the optical components (31, 32) within the head (3), and a determination part (6) compares the light reception value against a preset threshold value.

7 Claims, 7 Drawing Sheets

U.S. PATENT DOCUMENTS

| | | | |
|---|---|---|---|
| 6,649,866 B2 * | 11/2003 | Reichmann et al. | 219/121.84 |
| 6,859,472 B2 * | 2/2005 | Betin et al. | 372/35 |
| 7,241,965 B2 * | 7/2007 | Burt et al. | 219/121.63 |

FOREIGN PATENT DOCUMENTS

| | | | |
|---|---|---|---|
| GB | 002053717 A * | | 2/1981 |
| JP | S61-059366 U | | 4/1986 |
| JP | 62187591 A * | | 8/1987 |
| JP | S62-189889 U | | 12/1987 |
| JP | H01-114189 U | | 8/1989 |
| JP | 03072687 A * | | 3/1991 |
| JP | H05-256947 A | | 10/1993 |
| JP | 407163913 A * | | 6/1995 |
| JP | H07-223086 A | | 8/1995 |
| JP | 08118056 A * | | 5/1996 |
| JP | H09-248692 A | | 9/1997 |
| JP | 410024384 A * | | 1/1998 |
| JP | 410180476 A * | | 7/1998 |
| JP | 410216977 A * | | 8/1998 |
| JP | 410328876 A * | | 12/1998 |
| JP | 11216589 A * | | 8/1999 |
| JP | H11-239889 A | | 9/1999 |
| JP | 2000-263275 A | | 9/2000 |
| JP | 2000-263276 A | | 9/2000 |
| JP | 2001-269788 A | | 10/2001 |

* cited by examiner

METHOD AND DEVICE FOR PREVENTION OF ADHESION OF DIRT AND CONTAMINATION ON OPTICAL PARTS IN LASER BEAM MACHINE

TECHNICAL FIELD

The present invention relates to a method and apparatus for preventing fouling of optical components in order to prevent deterioration of machining quality in a laser machining system.

BACKGROUND

Conventionally, laser machining systems are used for the cutting, drilling, surface machining and marking of steel, nonferrous materials, ceramics, glass, plastic, leather, cloth, wood or various other materials (hereinafter referred to as the "workpiece") as well as for the welding of steel, nonferrous and other materials (hereinafter collectively referred to as "machining"). Furthermore, the mainstream types of lasers used include YAG lasers, $CO_2$ lasers and excimer lasers.

For example, a YAG laser machining system may have a constitution wherein laser light generated by a laser oscillator is transmitted through an optical fiber, and concentrated onto the workpiece by means of a condensing lens provided within the head. Moreover, such a head can be manipulated in three dimensions according to an operating procedure stored in a computer or the like, thus permitting extremely fine machining to be performed. Note that protective glass that protects the condensing lens from spatter, fumes, dust and the like (hereinafter referred to as simply "dust") arising during the machining of the workpiece is provided in the space between the condensing lens and the workpiece. In addition, shield gases, assist gases and other process gases (hereinafter referred to as simply "process gases") are supplied to the machining area, thus preventing deterioration of the machining quality.

However, in the laser machining as described above, dust arising during machining may adhere to the protective glass and the like, thus preventing the condensing of laser light and causing deterioration in machining quality. To solve this problem, the publication of unexamined Japanese patent application (Kokai) No. JP-A H11-239889 proposes a constitution that comprises a nozzle through which laser light (referred to as a "laser beam" in the publication) and process gases may pass. The constitution further comprises a plurality of ring-shaped flow-straightening plates provided in front of the condensing lens inside a nozzle holding space such that their inside diameter becomes smaller the closer they are to the workpiece. Gases injected from the gas injection nozzle along the flow-straightening plates can be exhausted from internal spaces in the nozzle holder to external spaces. By adopting such a constitution, it is possible to completely block dust during machining and protect the condensing lens, and thus prevent fouling of the window.

In addition, JP-A H05-256947 proposes an internal contamination detection technique for distance measuring apparatus based on optical means. This technique is one whereby fouling of the lens or front glass or the like is detected by catching part of the light used for measuring distances which is scattered backward at the time that the light passes through the lens or front glass or the like.

However, the apparatus proposed in JP-A H11-239889 does not take into consideration the suction of air from the side opposite the gas injection nozzle. Accordingly, when the amount of gas ejected from the gas injection nozzle becomes large, then negative pressure is generated in the vicinity of the gas ejection nozzle, thus drawing in dust in the vicinity and giving rise to turbulent flow also in the interior of the holder, so the ability to exhaust dust is decreased and the ability to prevent the adhesion of dust is also decreased. In addition, while a plurality of ring-shaped flow-straightening plates is provided in order to straighten the flow of gas ejected from the gas injection nozzle and block dust, if the amount of gas ejected from the gas injection nozzle becomes large, then the atmospheric gas in the machining area will also be simultaneously drawn in. Accordingly, the normal machining atmosphere cannot be maintained and the meritorious effect of the flow-straightening plates is diminished and machining quality deteriorates.

In addition, the apparatus proposed in JP-A H05-256947 uses a special optical lens in order to catch the light scattered by fouling, so the head becomes large, thereby adding limitations to the machining orientations and otherwise reducing its degrees of freedom. In addition, in the case that this technique is adopted in a laser machining system, the machining laser is high-powered in contrast to one used for measuring distances, so quartz glass is used for the condensing lens and the fabrication of a special lens using this quartz glass is difficult. Moreover, while the measurement of distance is performed by catching reflected light from the light given off, the intensity of light from outside the apparatus is also caught at the same time. Accordingly, regardless of any fouling of the lens, front glass or the like, the intensity of light caught may also vary depending on the season, weather, time of day or other circumstances at the time of measurement, thereby giving rise to dispersion in the detection data and poor reliability.

The present invention came about in order to solve the aforementioned problems and has as its object to provide a method and apparatus for preventing the fouling of optical components by the adhesion of dust arising during laser machining, by inducting air from the rear of the injection area while injecting gas in the direction in which the laser light passes, so as not to disturb the machining gas, in the space between the workpiece and the head that concentrates laser light from the light source and irradiates the workpiece.

BRIEF SUMMARY

The present invention prevents the dust arising during laser machining from adhering to optical components by: in the space between a workpiece and optical components that condense laser light from a light source and shine it on the workpiece, injecting gas while inducting air from the rear of a plurality of injectors disposed at stipulated intervals between them in the direction in which the laser light passes, so as not to disturb the machining gas.

The method of the present invention can be implemented by an apparatus according to the present invention wherein a plurality of nozzles able to induct air from behind while injecting gas toward laser light irradiated toward the workpiece is provided to the side of the space between the optical components and the workpiece.

Moreover, by doing so it is possible to prevent disturbance to the machining gas during laser machining. In addition, no disturbance occurs in the flow of air from behind the injectors, and the flow of gas from the nozzles is stabilized, thus preventing gas that contains dust from being drawn in and allowing clean gas to be blown toward the path in which the laser light passes. Even if drifting dust is present, it can be exhausted immediately out of the system without allowing it to remain long, so dust and the like that arises during laser machining can be prevented from adhering to the optical components of the head.

Each of the plurality of nozzles smoothes the flow of air inducted from behind and is preferably given a shape, e.g. a streamlined shape, that does not allow a negative pressure to arise in the vicinity of the injectors. In addition, it is preferable that the nozzles adjacent to the workpiece be disposed such that they are close to the centerline of the laser light, and the length of the nozzles preferably becomes shorter the closer they are to the workpiece. In addition, among the plurality of nozzles, it is preferable that those closer to the workpiece be pointed in a direction perpendicular to the direction in which the laser light passes, while the nozzles near the head be pointed toward the workpiece from the direction perpendicular to the direction in which the laser light passes. By doing so, in addition to the function of the nozzle alone, the synergistic effect of this configuration is added so that the atmosphere is further from that of the dusty atmosphere the closer one gets to the optical components, so dust is no longer present in the path in which the laser light passes.

In addition, the present invention comprises the aforementioned apparatus according to the present invention wherein a plurality of flow-straightening plates are disposed in the space between said plurality of nozzles and the workpiece, at stipulated intervals between them in the direction in which the laser light passes. These flow-straightening plates enhance the aforementioned function and meritorious effects.

In addition, in the present invention, a radiant heat barrier is disposed on the workpiece side of the flow-straightening plates. By placing a radiant heat barrier in the location that is most susceptible to the effects of machining heat, the conduction of heat to the optical components within the head is effectively prevented, so the effect of preventing thermal deterioration is well achieved.

In addition, in the present invention, a machining atmospheric gas nozzle is provided upon said radiant heat barrier. This machining atmospheric gas nozzle can maintain a good machining atmosphere without disturbance, thereby preventing deterioration of the machining quality.

The present invention is also any of the apparatus according to the present invention described above, wherein an injection nozzle that injects gas toward the gas injected by said plurality of nozzles is disposed in the vicinity of those optical components closest the workpiece among the optical components. By means of this injection nozzle, it is possible to push down the blow-up of dust-containing gas from the machining area, the more in the atmosphere closest to the optical components nearest the workpiece, and thus the prevention of fouling of optical components nearest the workpiece can be done even more effectively. By injecting gas from this injection nozzle directly onto the optical components closes the workpiece, then a major effect of cooling the optical components closes the workpiece can be achieved, so the adhesion of dust to these optical components can be completely prevented. Even if dust should adhere, the adhered dust is blown off. The injected gas travels down and combines with the gas from the aforementioned plurality of nozzles, thereby achieving an even better effect of preventing dust adhesion.

The present invention is also any of the apparatus according to the present invention described above, wherein a suction nozzle is disposed on the side opposite that of said plurality of nozzles such that they lie on either side of the path in which the laser light passes. This suction nozzle can suck up dust arising during laser machining.

The present invention is also any of the apparatus according to the present invention described above, wherein a pair of side plates that unidirectionally guide the flow of gas injected from these nozzles is disposed with one on either side of said plurality of nozzles. These side plates assist the function of the aforementioned nozzle.

The present invention is also any of the apparatus according to the present invention described above, comprising an apparatus for detecting the fouling of optical components which comprises: a light receptor disposed on the upstream side of said optical components that transmits or reflects laser light while also reflecting or transmitting and receiving reflected light and scattered light arising from fouling adhering to the optical components, and a determination part that accepts input of said reflected light and scattered light received by said light receptor and makes a determination as to whether or not the value of this input reflected light and scattered light exceeds a threshold value. This fouling detection apparatus eliminates optical noise and permits accurate detection of fouling.

DETAILED DESCRIPTION OF THE DRAWINGS AND THE PRESENTLY PREFERRED EMBODIMENTS

In order to describe the present invention in detail, here follows a description made with reference to the appended FIGS. 1-9.

We shall first describe in detail the apparatus for preventing the fouling of optical components according to the present invention.

Figure 1:
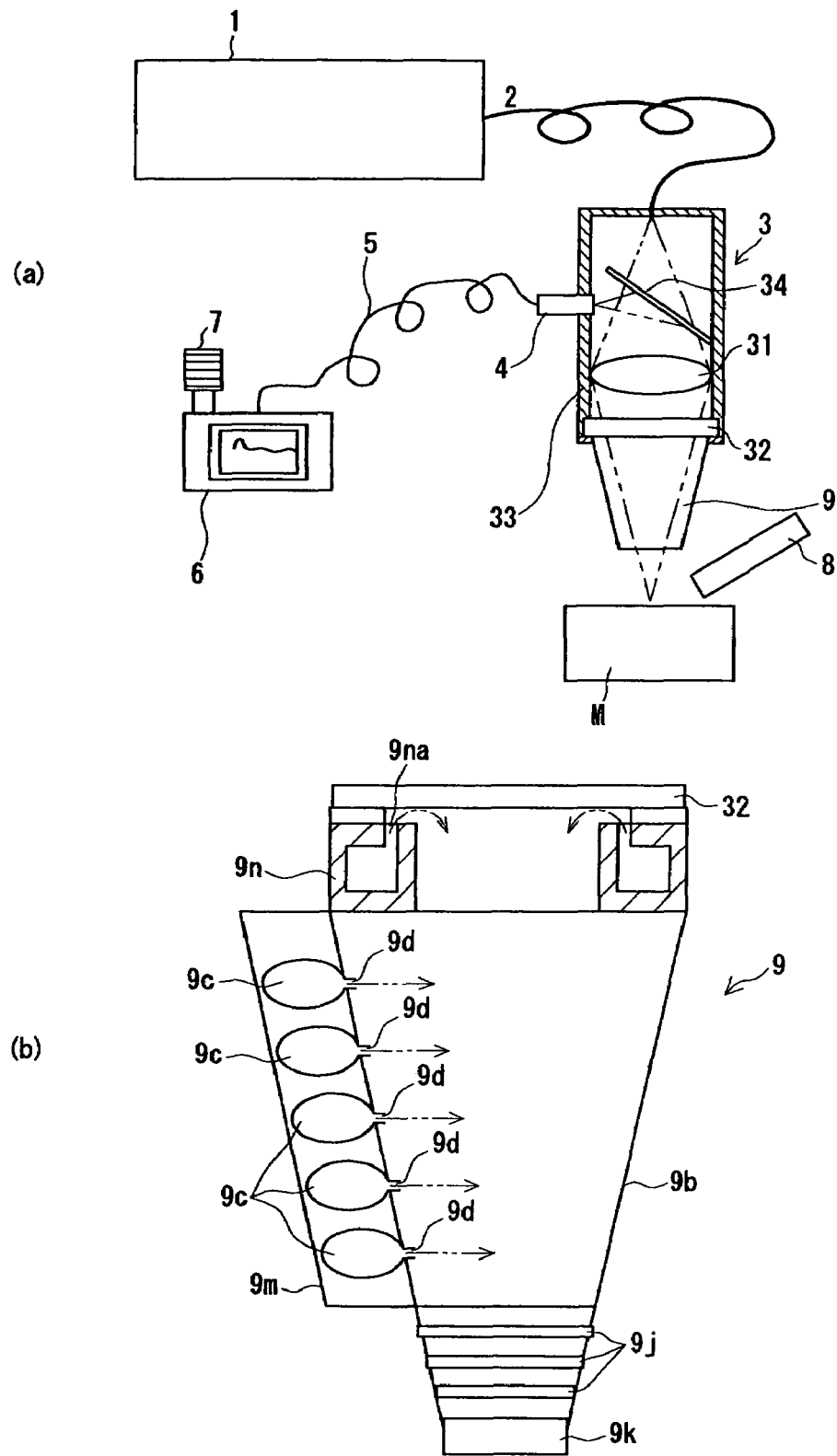
FIG. 1(a) is a diagram of the constitution of an apparatus for preventing the fouling of optical components according to the present invention, which is installed in a YAG laser machining system, along with a partial cross section of the fouling detection apparatus that constitutes this fouling prevention apparatus.
FIG. 1(b) is a front view illustrating a partial cross section of a first embodiment of the apparatus for preventing the fouling of optical components according to the present invention.

In FIG. 1(a), 1 is a laser oscillator that generates laser light, and the laser light thus generated is transmitted via an optical fiber 2, focused within a head 3 and used to irradiate the workpiece M.

Within the head 3 are provided a condensing lens 31 that concentrates laser light and a protective glass 32 that protects this condensing lens 31 from dust, in this order when going toward the workpiece M. Note that 33 is the head frame while 8 indicates a nozzle for supplying shield gas. The constitution thereof is the same as in the prior art.

The fouling prevention apparatus 9 according to the present invention is disposed between the head 3 and the workpiece M, and may take the shape of an inverted truncated cone (the shape of a cone with its top portion cut off and then inverted vertically), for example. Moreover, its central portion serves as the path in which the laser light passes wherein light is concentrated by the condensing lens 31 from top to bottom with the focus of the laser light lying upon the workpiece M.

FIG. 1(b) illustrates the first embodiment of the fouling prevention apparatus 9 of the present invention, wherein five nozzles 9c, for example, may be attached along the left side (in the plane of the paper) of a frame 9b at fixed intervals in the vertical direction in the plane of the paper.

The nozzles 9c have elliptical cross sections that are flattened in the vertical direction in the drawing, in a constitution which provides a number of circular nozzle holes 9d, for example, that inject gas toward the laser light. By making the cross sections of the nozzles 9c elliptical, when gas is injected, the amount of air inducted from the rear of the nozzles 9c is assured and the flow of this air becomes even smoother. When gas is injected from nozzles 9c of such a shape, the air in the surroundings that is drawn into the injected gas also assumes the same flow as the gas, so no negative pressure is generated in the vicinity of the nozzles 9c.

At this time, in the event that there are no gaps between the nozzles 9c where air in the vicinity can adequately flow, and the shape is one to which the flow of air does not become accustomed, then negative pressure arises in front of the nozzles 9c, giving rise to vortices in the injected gas or inflowing air or causing turbulence, thus agitating the atmosphere in the path in which the laser light passes, so the effectiveness of the exhausting of drifting dust is decreased.

However, the present invention is constituted such that air to the rear of this nozzles 9c can be inducted in the flow-straightened state from between the nozzles 9c, so the injected gas and inducted air flow through the path, in which the laser light passes, in the flow-straightened state, thus pushing out any dust present and preventing the adhesion of dust to optical components. Moreover, when looking from above in the plane of the paper in FIG. 1(b), these nozzles 9c may be provided with a plurality of nozzle holes 9d present in a long, narrow strip at stipulated intervals apart, for example, so the gas can be ejected in a band shape toward the irradiated laser light. Note that 9m is a filter that prevents the inducted air from containing dust.

Here, 9j indicates flow-straightening plates provided toward the side of the workpiece M from the nozzles 9c, being provided substantially perpendicular to the direction in which the laser light passes, with three plates disposed equidistantly. These flow-straightening plates 9j form a boundary that separates the upper and lower atmospheres, so the shield gases used in laser machining are not disturbed by the gas injected from the nozzles 9c. In addition, even if dust-containing gas generated in the machining area should approach these flow-straightening plates 9j, the dust-containing gas will flow horizontally, guided by the flow-straightening plates 9j, and the dust will not go toward the head 3. These flow-straightening plates 9j exhibit adequate effectiveness even if only a few are provided at intervals of roughly a couple of mm.

In addition, with this embodiment, the aforementioned nozzles 9c and flow-straightening plates 9j are disposed closer to the central axis of the laser light the nearer they are to the workpiece M. The path in which the laser light passes becomes smaller the closer it gets to the workpiece M, so in order to protect the optical components from dust and the heat of working, it is effective for the nozzles 9c and flow-straightening plates 9j to be disposed as described above and narrow their range of effect.

Now, 9k is a radiant heat barrier disposed further toward the workpiece M side of the flow-straightening plates 9j so as to secure the path in which the laser light passes. This radiant heat barrier 9k may have a constitution wherein cooling water within a water channel flows from one end to the other end, for example. The water channel is preferably made of a metal with good cooling performance such as copper, for example. By disposing this radiant heat barrier 9k at a position closest to the workpiece M that is most susceptible to the effects of heat during machining, it exhibits a superior cooling effect and is able to greatly prevent deterioration of the condensing lens 31, protective glass 32 and other optical components within the head 3.

Moreover, in this first embodiment, an injection nozzle 9n is provided immediately below the protective glass 32. This injection nozzle 9n is annular in shape, with the path in which the laser light passes being formed in its center. The nozzle holes 9na of the injection nozzle 9n may point upward, for example, so that they blow gas directly onto the outside surface of the protective glass 32. In this manner, even if dust-containing gas was to float upward and dust was to adhere to the protective glass 32, it can be adequately removed and there is also the effect of cooling the protective glass 32. In addition, the blown gas will drop after coming into contact with the protective glass 32, thus preventing dust from floating up at this time also.

In this first embodiment, the gas injected from injection nozzle 9n is blown directly onto the outside surface of the protective glass 32, but even if the nozzle holes 9na of this injection nozzle 9n were to point downward, thus joining with the gas injected from the nozzles 9c, this can prevent dust from floating up and prevent the adhesion of dust to the protective glass 32.

Figure 2:
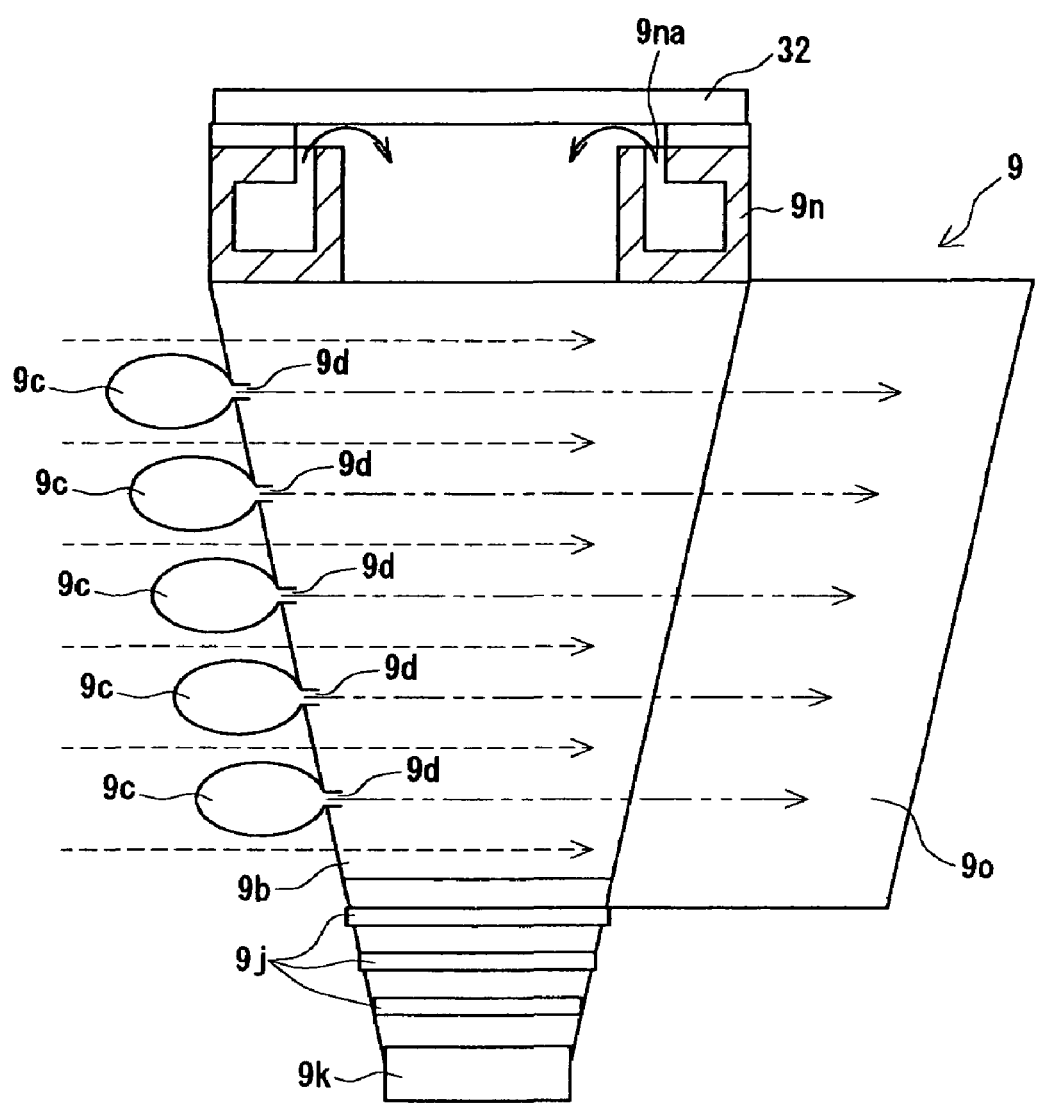
FIG. 2 is a diagram of a second embodiment of the fouling prevention apparatus shown in partial cross-section.

FIG. 2 illustrates the second embodiment of the fouling prevention apparatus 9. In this second embodiment, the filter 9m is eliminated from the fouling prevention apparatus 9 illustrated in the first embodiment above, and a suction nozzle 9o is disposed on the side opposite that of the nozzles 9c such that they lie on either side of the path in which the laser light passes.

In this second embodiment, this suction nozzle 9o sucks up any dust generated during laser machining. Even though the suction flow of this suction nozzle 9o may be greater than the gas flow ejected from the plurality of nozzles 9c, the plurality of nozzles 9c induct air so this is no problem. In addition, even if the plurality of nozzles 9c should fail, a certain degree of function can be maintained by means of this suction nozzle 9o.

Figure 3:
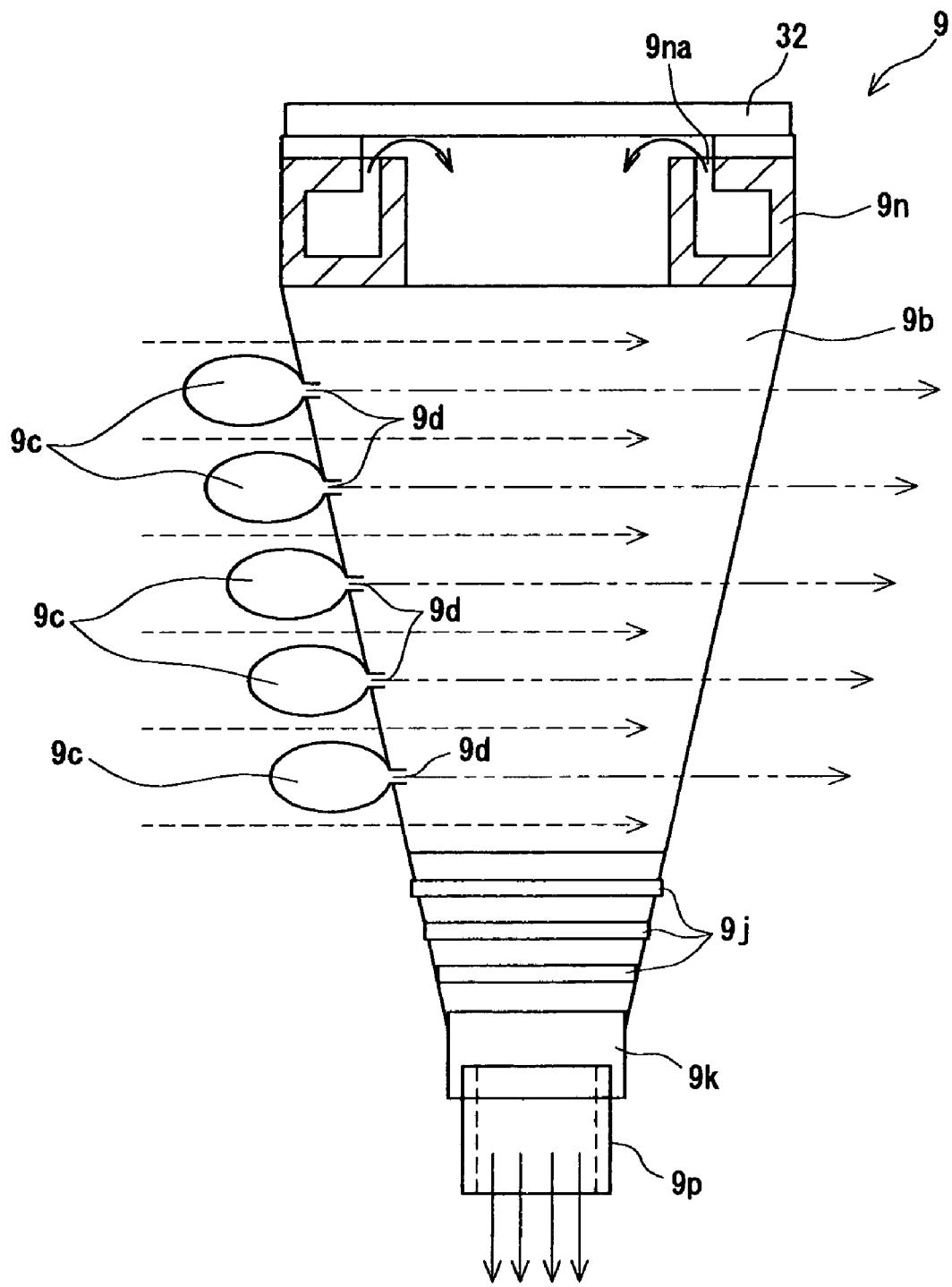
FIG. 3 is a diagram of a third embodiment of the fouling prevention apparatus shown in partial cross-section.

In addition, FIG. 3 illustrates the third embodiment of the fouling prevention apparatus 9. In this third embodiment, the suction nozzle 9o is eliminated from the fouling prevention apparatus 9 illustrated in the second embodiment above, and a machining atmosphere gas nozzle 9p is provided in the radiant heat barrier 9k.

Figure 4:
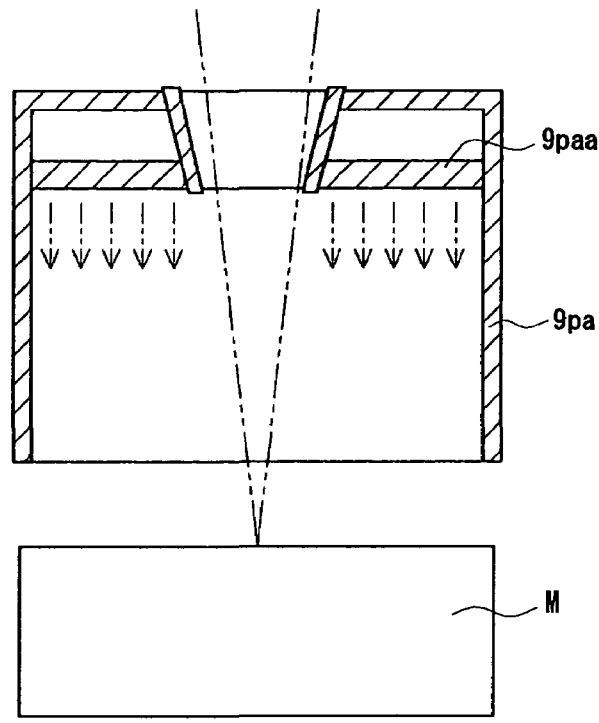
FIG. 4 is an explanatory diagram of a machining atmospheric gas nozzle suited to welding.
Figure 5:
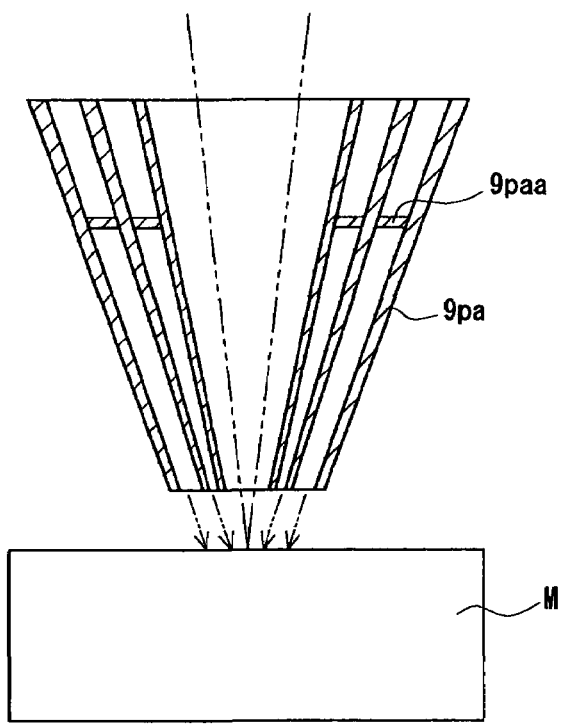
FIG. 5 is an explanatory diagram of a machining atmospheric gas nozzle suited to cutting.

By providing this machining atmosphere gas nozzle 9p, a good machining atmosphere can be maintained without disturbance, so it is possible to prevent deterioration of the machining quality. When used for welding, for example, as shown in FIG. 4, this machining atmosphere gas nozzle 9p preferably has a double gas jacket 9pa in the portion near the laser and a single gas jacket in the lower portion on the side of the workpiece M. When used for cutting, as shown in FIG. 5, a sharp-tipped double or triple gas jacket 9pa is preferable. When vapor-deposited metal or a metal mesh 9paa is deposited on the interior of this gas jacket 9pa (on the side of the workpiece M within the double gas jacket 9pa illustrated in FIG. 4), it is possible to prevent damage due to laser light reflected from the workpiece M, and this also has a flow-straightening effect.

Figure 6:
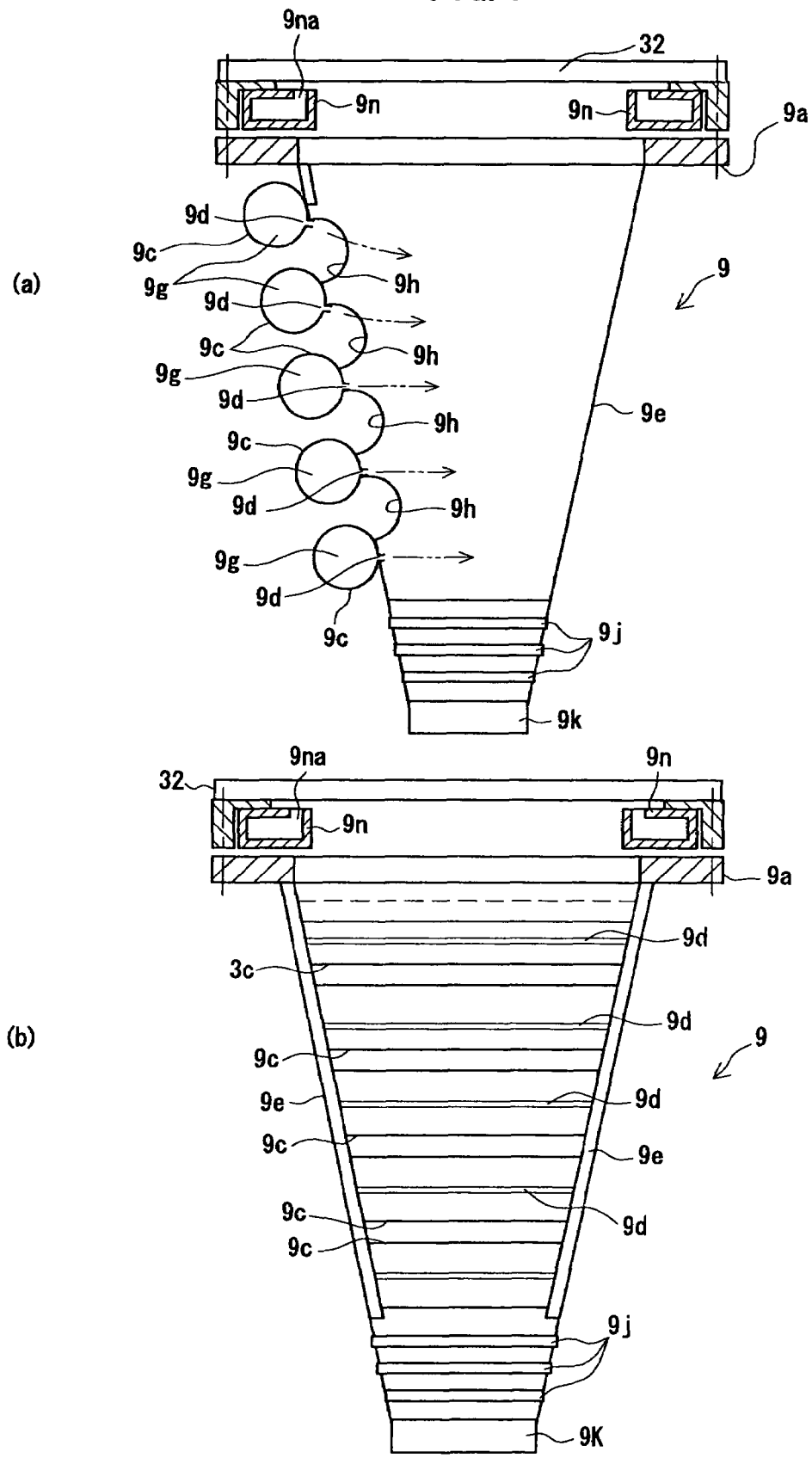
FIG. 6 is a diagram of a fourth embodiment of the fouling prevention apparatus shown in partial cross-section, where (a) is a front view thereof and (b) is a side view thereof.

FIG. 6 illustrates the fourth embodiment of the fouling prevention apparatus 9. In this embodiment, a top frame 9a for connecting to the head 3 is provided on the top edge of the fouling prevention apparatus 9, and a pair of side plates 9e (equivalent to the frame 9b) that maintain the path in which the laser light passes is attached to this top frame 9a. Moreover, five nozzles 9c with circular cross sections are attached to the side edges of this pair of side plates 9e (to the left in the plane of the paper in FIG. 6(a)) such that a constant interval is maintained in the up and down direction in the plane of the paper.

In the case of fouling prevention apparatus 9 of the same size (height), if the cross-sectional shape of the nozzles 9c is made circular as is adopted in the fourth embodiment, then the gaps between adjacent nozzles 9c become smaller, the amount of air inducted by the gaps between nozzles 9c may become inadequate, and a negative pressure may arise in the vicinity of the nozzles due to this inadequate amount of air. Accordingly, in this fourth embodiment, notches 9h are provided on the nozzle 9c side of the side plates 9e, thus increasing the amount of air inducted from the gaps between the nozzles 9c. Thereby, turbulence does not occur in the inducted air, preventing dust-containing gas from being drawn into the path in which the laser light passes, and thus achieving the effect of exhausting dust when dust is present. Moreover, the pair of side plates 9e further isolate the path in which the laser light passes from the effects of the surrounding, thus blocking the intrusion of dust-containing gas and forming a unidirectional gas flow in the direction from the nozzles 9c.

In addition, slit-shaped nozzle holes 9d are provided on the nozzles 9c in the direction in which the laser light passes (the direction of penetrating the pair of side plates 9e; see FIG. 6(b)). In this embodiment 4, among the five nozzles 9c, the lower three inject gas in a direction substantially perpendicular to the direction in which the laser light passes, while the upper two inject gas toward the workpiece at an angle of 10-20° toward the direction perpendicular to the direction in which the laser light passes (see FIG. 6(a)). This prevents dust-containing gas from being blown up into the atmosphere near the protective glass 32.

Furthermore as shown in FIG. 6(b), in this fourth embodiment, the length of the long, thin nozzles 9c becomes shorter the closer they are to the workpiece M. This is so that they match the shape of the path in which the laser light passes, thus avoiding the use of unnecessary gas to be injected and making the fouling prevention apparatus 9 more compact and lightweight. In particular, when the side plate 9e are provided as in the fourth embodiment, the function and meritorious effects of these side plates 9e are compounded, so it is possible to adequately prevent dust-containing gas from being blown in even if the nozzles 9c adjacent to the workpiece M are shortened.

Note that each of the nozzles 9c, which are omitted from the drawing, is individually connected to the opposite side of the nozzle holes 9d by a distribution line used to distribute the gas to be injected.

In the fouling prevention apparatus 9 according to the present invention, it is preferable for the pressure of gas injected from the nozzles 9c to become greater the closer to the workpiece M, thus adequately shielding from dust-containing gas in areas near the workpiece M. In order to achieve this, the gas supply from the individual supply lines to the distribution lines should preferably be performed from the side closer to the workpiece M, thus increasing the gas pressure within the distribution lines near the workpiece M and increasing the supply pressure to the nozzles 9c near the workpiece M.

It is preferable that the volume within the nozzles 9c be increased to form reservoirs 9g and for the gas injection volume (pressure) to be made equal at each portion of the nozzle holes 9d. The area in front of the nozzle holes 9d is a cavity which is the path in which the laser light passes, so the reaction force of injected gas borne by the nozzle holes 9d is small. Accordingly, the pressure within the nozzles 9c is apt to decrease and the meritorious effect of providing the reservoirs 9g is great. For this reason, it is preferable for the nozzles 9c to be tubular. In the fourth embodiment, the nozzles 9c are cylindrical. In the event that no reservoirs 9g are provided, the pressure would be greatest at the gas introduction position for the nozzles 9c, with the pressure decreasing the further away from the gas introduction position, so the gas exhaust pressure is different depending on the position of the nozzle holes 9d.

Note that regarding the providing of flow-straightening plates 9j and the radiant heat barrier 9k, and regarding the providing of the injection nozzle 9n, this is the same in the fourth embodiment as in the first-third embodiments, so an explanation is omitted.

The apparatus for preventing fouling of optical components in a laser machining system according to the present invention is as described above, but:

① providing a filter in the injected gas supply route in order to purify the injection gas,
② adopting air for the injected gas,
③ providing a valve that can adjust the flow rate on the upstream side of the nozzles 9c,
④ adopting a constitution wherein the installation intervals between the nozzles 9c and flow-straightening plates 9j can be changed or adjusted, and
⑤ adopting a constitution wherein the width of the openings of the nozzle holes 9d can be changed or adjusted depending on the position of the nozzles 9c, and the like are each included within the technical scope of the present invention.

Figure 7:
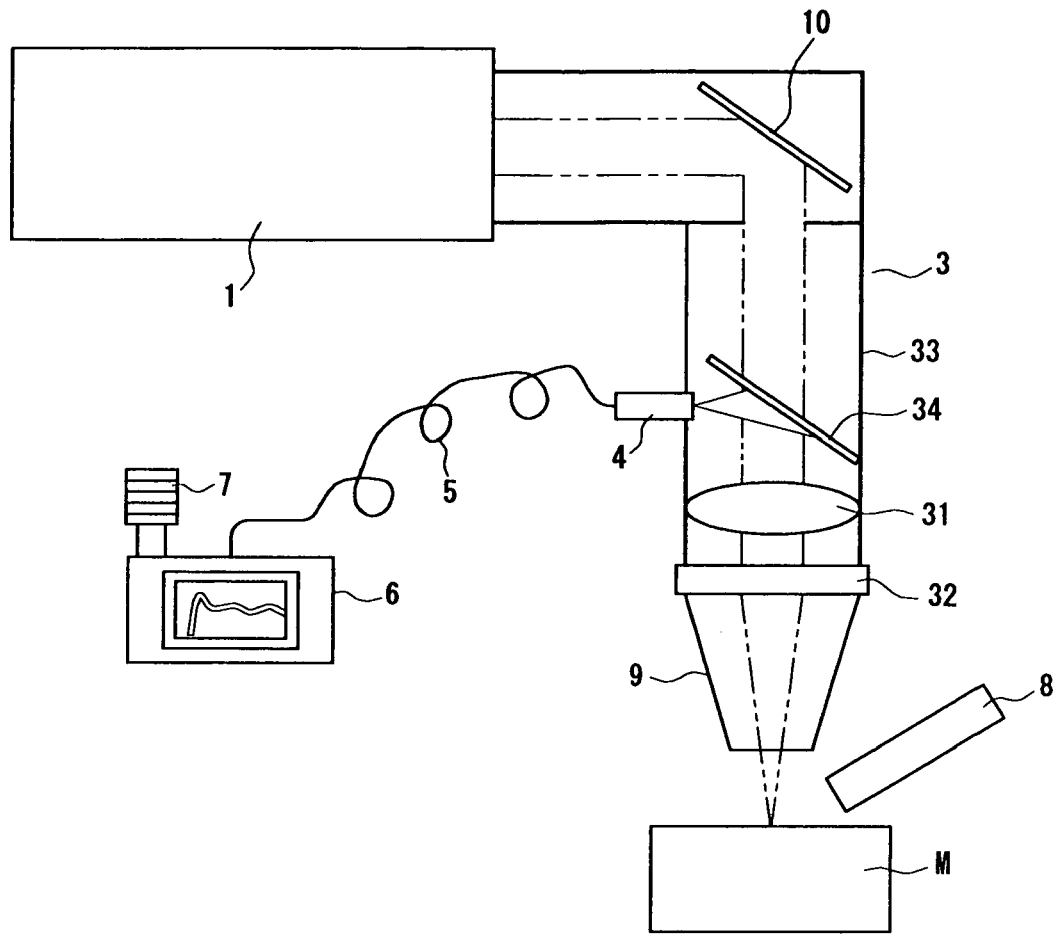
FIG. 7 is a partial cross-sectional constitution diagram of another embodiment of the fouling prevention apparatus according to the present invention provided with a fouling detection apparatus.

Note that the phantom-line arrows (double-dashes line) in FIG. 1(b), FIGS. 2-3 and FIG. 6(a) represent the flow of gas discharged from the nozzle holes 9d. In addition, the method of transmitting the laser light from the laser oscillator 1 to the head 3 is not limited to the optical fiber 2, but rather it may also be conducted by means of a reflective mirror 10 as shown in FIG. 7. In addition, these embodiments were described using the head of a YAG laser machining system as an example, but the present invention is in no way limited to the head of a YAG laser machining system but rather it is applicable to the head of any type of laser machining system.

Here follows a description of a fouling detection apparatus which is a constituent element of the apparatus for preventing fouling of optical components in a laser machining system according to the present invention, made with reference to the embodiments illustrated in FIG. 1(a) and FIGS. 7-9.

In the diagram of the constitution of the partial cross section of the YAG laser machining system of FIG. 1(a), it was previously described that the condensing lens 31 and protective glass 32 are provided within the head 3.

This head 3 is susceptible to being directly exposed to dust-containing gas arising at the time of machining of the workpiece M, so measures to prevent the adhesion of dust to the head 3 have been tried, but there are cases in which dust adheres to the condensing lens 31, protective glass 32 and other optical components not only due to long-term usage but also due to merely being stored for a long time depending on the storage location.

When dust is adhering to the condensing lens 31 and protective glass 32, diffuse reflection occurs due to this dust when the laser light received by the head 3 passes through. In addition, the index of refraction of laser light also changes and the machining precision of the workpiece M deteriorates. Accordingly, close attention must be paid to the fouling of optical components, and it is occasionally necessary to detect the presence of fouling.

The apparatus for preventing fouling of optical components 9 according to the present invention provided with a fouling detection apparatus has a constitution such that a light receptor 4 is provided upstream of the condensing lens 31, and the reflected light and scattered light arising from fouling adhering to the condensing lens 31 and protective glass 32 is received by the light receptor 4.

For example, in the examples of FIG. 1(a) and FIG. 7, a laser light-transmitting/reflecting mirror 34 is provided on the upstream side of the condensing lens 31, so that laser light irradiated through the ceiling area of the head frame 33 is transmitted and reaches the condensing lens 31 and protective glass 32. On the other hand, light scattered from the condensing lens 31 and protective glass 32 due to fouling is reflected by the laser light-transmitting/reflecting mirror 34 and received by the light receptor 4 provided on the side of the head frame 33.

Figure 8:
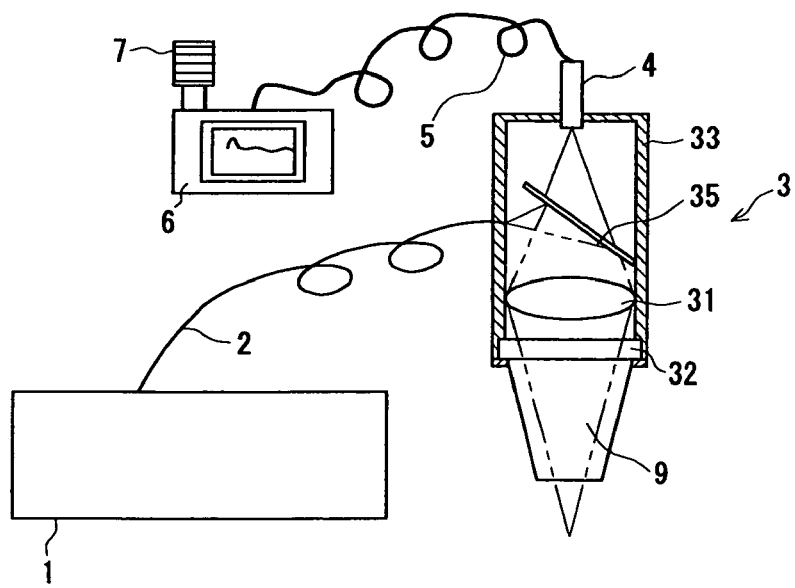
FIG. 8 is a partial cross-sectional constitution diagram of another embodiment of the fouling detection apparatus constituting the apparatus for preventing the fouling of optical components according to the present invention.

In addition, in the example of FIG. 8, a laser light-reflecting/transmitting mirror 35 is provided on the upstream side of the condensing lens 31, and the laser light irradiated from the side of the head frame 33 is reflected by this laser light-reflecting/transmitting mirror 35 toward the condensing lens 31 and protective glass 32. On the other hand, scattered light and reflected light from the condensing lens 31 and protective glass 32 due to fouling is transmitted through the laser light-reflecting/transmission mirror 35 and received by the light receptor 4 provided on the ceiling of the head frame 33.

The light receptor 4 receives the reflected light and scattered light and converts the intensity of this received light into an intensity signal. The intensity of the signal increases as the amount of dust adhering becomes greater. The signal value from the light receptor 4 is conducted to the determination part 6 by a transmission cable 5.

The determination part 6 takes the transmitted signal value to be the received-light value and determines whether or not fouling is present by comparing the received-light value against a preset threshold value.

Figure 9:
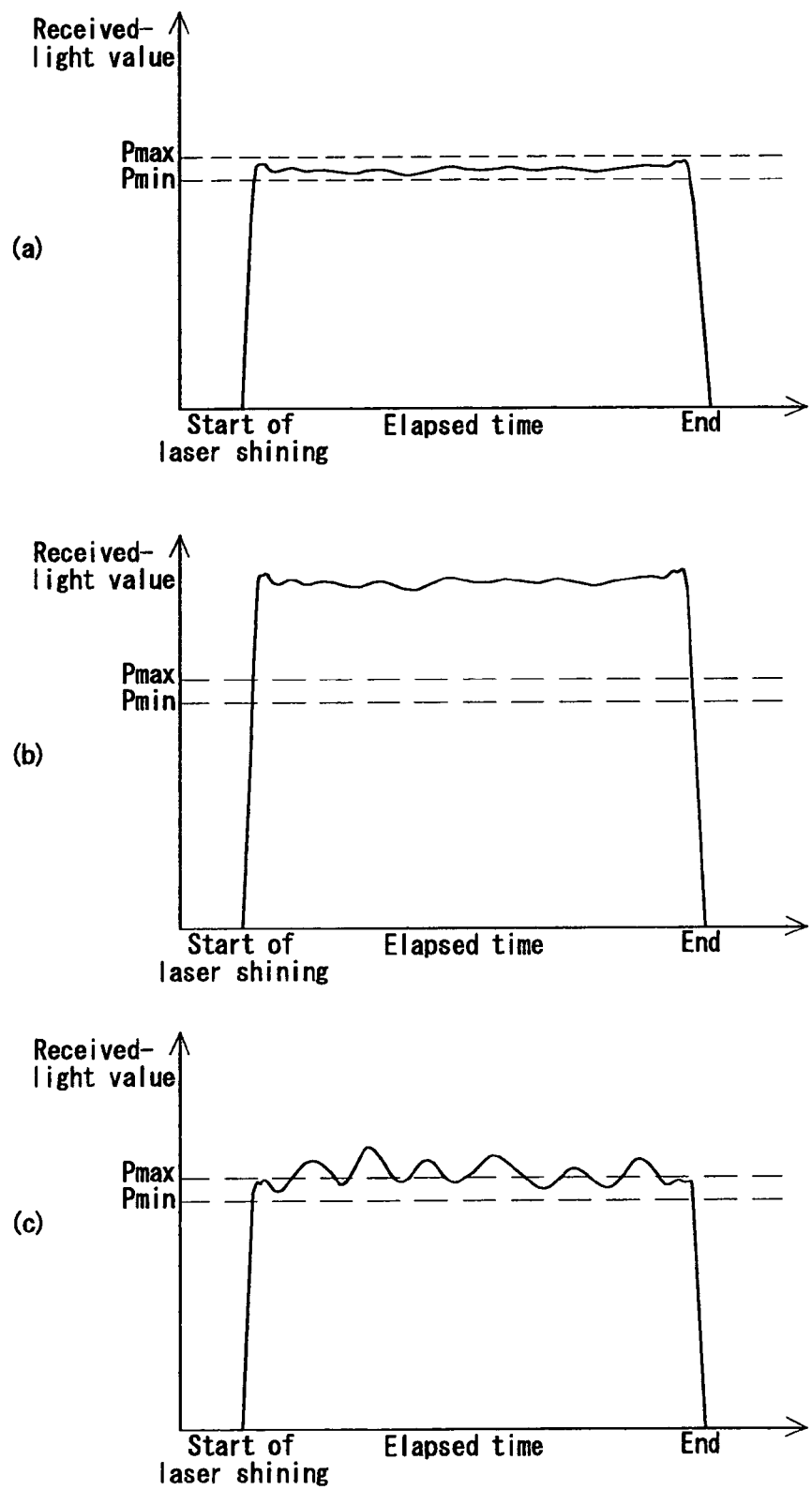
FIG. 9 is a diagram illustrating the processing of the determination part of the fouling detection apparatus, where (a) illustrates the case of no fouling present, (b) illustrates the case of fouling present and (c) is a diagram of the case in which a machining defect has occurred.

FIG. 9 is a plot illustrating the received-light value at the light receptor 4 in the case in which fouling is present and the case in which no fouling is present, with the intensity of the received-light value at the light receptor 4 due to laser-light irradiation presented on the vertical axis, at various times from the start of laser irradiation to the end of irradiation on the horizontal axis.

In the example of this FIG. 9, in the case of (a) where the protective glass 32 and condensing lens 31 are not fouled, the received-light value fluctuates between the values $P_{max}$ and $P_{min}$. On the other hand, when the protective glass 32 and condensing lens 31 are fouled, the received-light value fluctuates at values much higher than $P_{max}$ as shown in (b).

Accordingly, by setting this value of $P_{max}$ as the threshold value, it is easy for the determination part 6 to detect whether or not the protective glass 32 and condensing lens 31 are fouled. Note that when a machining defect occurs, the threshold value $P_{min}$ will also be exceeded, but as shown in (c), the amplitude of fluctuation will be greater than in the case of fouling, so it is easy to distinguish this from the case of fouling.

In the event that fouling is detected based on the determination of the determination part 6, the results thereof may be sent to a display device or sent to an alarm device 7, thus attracting the notice of the worker.

When fouling is investigated using this fouling detection apparatus, it is preferably performed in the state in which no laser machining is actually performed and no problems would occur if the laser light is irradiated for detection, where laser light is irradiated in a location where there is little reflected light other than from the head, and then the light reflected and scattered from the condensing lens 31 and protective glass 32 due to the incident laser light is caught to increase the detection accuracy. When detection is performed while performing laser machining, the light reflected from the machining area is also caught by the light receptor at the same time, so there is a risk of a false positive indication of fouling present depending on the type of machining, so in this case, it is necessary to set the threshold value in consideration of light reflected from the machining area. Note that the mounting location of the light receptor 4 differs between the example of FIGS. 1(a) and 7 and the example of FIG. 8, so the threshold value should also be set separately in these cases.

INDUSTRIAL USABILITY

As described above, the present invention is able to effectively prevent dust arising during machining from adhering to the condensing lens and protective glass. In addition, if a fouling detection apparatus is provided, superior detection can be performed reliably without giving rise to dispersion in the detection data depending on the situation at the time of detection.

The invention claimed is:

1. A method for preventing the fouling of optical components in a laser machining system which irradiates a laser light to machine a workpiece within a flow of machining gas, the method comprising the steps of:

into a space between a workpiece and optical components that condense the laser light from a light source and irradiate it onto the workpiece, injecting first shielding gases from a plurality of first injectors disposed at stipulated intervals in a direction in which the laser light passes, so as not to disturb the flow of machining gas, in order to shield the optical components from fumes, spatter and dust arising during laser machining, while inducting air from behind the plurality of first injectors, wherein at least one of the plurality of first injectors disposed closer to the optical components than the other first injectors directs the first shielding gas toward the first shielding gases from the other injectors;

unidirectionally guiding the first shielding gases with a pair of side plates disposed on sides of the plurality of first injectors;

isolating the space from the laser machining with at least one flow-straightening plate disposed between the plurality of first injectors and the and workpiece; and injecting a second shielding gas directly onto the optical components from at least one second injector provided immediately below the optical components and above the plurality of first injectors.

2. An apparatus that performs the fouling prevention method according to claim 1, comprising:

a plurality of first nozzles that inject the first shielding gases toward the laser light irradiated onto the workpiece, while inducting air from behind the plurality of first nozzles, the plurality of first nozzles being provided along a side of a space between the optical components and the workpiece, wherein at least one of the plurality of first nozzles disposed closer to the optical components than the other first nozzles directs the shielding gas toward the shielding gases from the other nozzles;

a plurality of flow-straightening plates disposed between the plurality of first nozzles and the workpiece at stipulated intervals in the direction in which the laser light passes;

a pair of side plates that unidirectionally guide the first shielding gas injected from the plurality of first nozzles, the pair of side plates being disposed on sides of the plurality of first nozzles; and at least one second nozzle that is provided immediately below the optical components and above the plurality of first nozzles, and injects the second shielding gas directly onto the optical components.

3. An apparatus for preventing the fouling of optical components in a laser machining system according to claim 2, wherein a radiant heat barrier is disposed on the workpiece side of the flow-straightening plates.

4. An apparatus for preventing the fouling of optical components in a laser machining system according to claim 3, wherein a gas nozzle for injecting the machining gas is provided with the radiant heat barrier.

5. An apparatus for preventing the fouling of optical components in a laser machining system according to claim 2, comprising an apparatus for detecting the fouling of optical components which comprises:

a light receptor disposed upstream of the optical components, the light receptor detecting the laser light scattered back through a separating mirror from the optical components due to the fouling thereof, and a determination part that determines whether or not the scattered laser light detected by the light receptor exceeds a threshold value.

6. An apparatus for preventing the fouling of optical components in a laser machining system according to claim 3, comprising an apparatus for detecting the fouling of optical components which comprises:

a light receptor disposed upstream of the optical components, the light receptor detecting the laser light scattered back through a half mirror from the optical components due to the fouling thereof, and a determination part that determines whether or not the scattered laser light detected by the light receptor exceeds a threshold value.

7. An apparatus for preventing the fouling of optical components in a laser machining system according to claim 4, comprising an apparatus for detecting the fouling of optical components which comprises:

a light receptor disposed upstream of the optical components, the light receptor detecting the laser light scattered back through a half mirror from the optical components due to the fouling thereof, and a determination part that determines whether or not the scattered laser light detected by the light receptor exceeds a threshold value.

* * * * *

UNITED STATES PATENT AND TRADEMARK OFFICE
CERTIFICATE OF CORRECTION

PATENT NO. : 7,605,345 B2  Page 1 of 1
APPLICATION NO. : 10/507718
DATED : October 20, 2009
INVENTOR(S) : Fukuda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 903 days.

Signed and Sealed this

Fifth Day of October, 2010

David J. Kappos
*Director of the United States Patent and Trademark Office*